455-614 AU 233 EX

12/20/83 OR 4,422,182

United States Patent [19]

Kenjyo

[11] 4,422,182

[45] Dec. 20, 1983

[54] DIGITAL MICROPHONE

[75] Inventor: Hideyuki Kenjyo, Koganei, Japan

[73] Assignee: Olympus Optical Co. Ltd., Japan

[21] Appl. No.: 354,702

[22] Filed: Mar. 4, 1982

[30] Foreign Application Priority Data

Mar. 12, 1981 [JP] Japan ............................ 56-33380[U]

[51] Int. Cl.$^3$ ......................... H04B 9/00; H04R 7/00; H04R 23/00

[52] U.S. Cl. ............................... 455/614; 179/121 R; 179/138

[58] Field of Search .................... 455/614; 179/121 R, 179/138

[56] References Cited

U.S. PATENT DOCUMENTS 3,286,032 11/1966 Baum .................................. 179/138

3,580,082 5/1971 Unknown ........................... 179/138

3,622,791 11/1971 Bernard ............................. 455/614

4,284,858 8/1981 Nicholson .......................... 455/614

*Primary Examiner*—Howard Britton

*Attorney, Agent, or Firm*—Parkhurst & Oliff

[57] ABSTRACT

A digital microphone for directly supplying a digital signal which designates the displacement of a diaphragm is disclosed. A cylindrical reflecting mirror is provided integrally with the diaphragm and reflects a band-shaped light beam to an array of photo electro transducers. A binary code pattern is formed in the surface of the mirror. The light beam is modulated by a variation of relative position of the code pattern and the light beam. The modulated light beam is transduced into the digital signal by the array of photo electro transducers.

18 Claims, 10 Drawing Figures

DIGITAL MICROPHONE

BACKGROUND OF THE INVENTION

The invention relates to a digital microphone capable of directly converting a displacement of a diaphragm into a digital signal with the aid of optical means. A Hi-Fi sound recently has been desired in the field of audio. To this end, various kinds of record carrier have been proposed such as a direct cutting record; a PCM disc record capable of preventing a decrease in a sound quality due to intermediate manufacturing processes, for example, track-down and mixing, by effecting a pulse-code modulation for the electric signal derived from a microphone; and a digital audio disc on which a digital signal obtained by effecting a pulse-code modulation for the electric signal derived from a microphone is directly recorded. The tendency described above with respect to the disc record and digital audio disc is applicable to the field of a magnetic tape.

When an analogue sound signal is converted into a digital signal, there is the problem that a high-speed, high-accuracy and inexpensive analogue to digital converter (A-D converter) cannot be easily obtained. The presently available A-D converters satisfy the requirements for high-speed and high-accuracy, however the cost thereof is still high, which is an obstruction for the development of a digital recording in an audio system. One of the methods for resolving the above problem is to directly derive from a microphone a digital signal which designates the displacement of a diaphragm, which makes it possible to omit the A-D converter from the audio system.

A conventional microphone which has been proposed for that purpose is shown in FIG. 1. A diaphragm 1 made of a plastic film is arranged opposite to a plurality of fixed electrodes 2, 2', 2'' . . . A metal layer 3 is applied on the surface of the diaphragm 1 by evaporation to form an electrode which is opposed to the fixed electrodes via an air-gap 4. A plurality of macromolecular films 5, 5', 5'' . . . each of which constitutes an electret for applying an electrostatic field to the air-gap 4 are sticked on the surfaces of the fixed electrodes, respectively. The fixed electrodes 2, 2' . . . and films 5, 5' . . . are embedded in an insulator 6. In this way, a plurality of condenser microphone elements are formed. A plurality of comparators 7, 7', 7''. . . are connected to the fixed electrodes 2, 2', 2'' . . . of the microphone elements, respectively. A voltage is applied to the electrode 3 via a metal case 8. The respective output voltages from the condenser microphone elements are compared to the comparators with predetermined reference voltages which are different from each other in a stepwise manner. A series of output signals from the comparators 7, 7', 7'' . . . constitute a binary code digital signal which designates the displacement of the diaphragm 1. In this manner the acoustic energy incident upon the diaphragm is converted into the digital signal.

FIG. 2 shows a part of the electric circuit included in the comparators of the known microphone of FIG. 1. It should be noted that FIG. 2 illustrates only three condenser microphone elements and the electric components related thereto in order to simplify the drawing. Each condenser microphone 9, 9' or 9'' is connected to the related comparator 10, 10' or 10''. Each voltage from the microphone element, 9, 9' or 9'' is compared with the related voltage applied by an adder 12, 12' or 12''. The adders are connected to the reference voltage sources, respectively, each value of which is denoted by $V_o$, $2V_o$ or $2^2V_o$. The switches 11, 11' and the adders 13, 13', 13'' serve to add the reference voltage of the upper position to the reference voltage of the lower position. The switches 11 and 11' are operated according to the output signals from the comparators 10' and 10'', respectively. If the output voltage of each microphone element 9, 9' or 9'' is V which is in $V_o \leqq V < 2V_o$, the binary code output signals from the output terminals A, B and C of the comparators 10, 10' and 10'' are "1", "0" and "0", respectively. Therefore, the binary code output signal "001" may be obtained from the microphone. When the output voltage of each microphone is $3V_o$ which is in $2V_o \leqq 3V_o < 2^2V_o$, the binary code output signals from the output terminals A, B and C are "1", "1" and "0", respectively. Consequently, the binary code output signal "011" may be obtained from the microphone.

As is apparent from the foregoing, these binary code output signals designate amounts of the displacement of the diaphragm due to an incident acoustic energy. However, such conventional microphone requires a complicated electric circuit so that the construction of the whole microphone is also complicated. Furthermore, the complicated process for manufacturing the diaphragm is necessitated.

SUMMARY OF THE INVENTION

It is an object of the invention to provide a digital microphone which can directly convert an incident acoustic energy into a digital signal.

It is another object of the invention to provide a digital microphone which is mechanically simple and inexpensive.

It is still another object of the invention to provide a digital microphone which does not require a complicated electrical circuit and a complicated diaphragm.

It is further object of the invention to provide a digital microphone which can derive a digital signal with a high reliability with the aid of optical means.

It is a still further object of the invention to provide a digital microphone having an excellent sensitivity.

According to the invention these objects are achieved by providing a digital microphone comprises:

a housing having an opening portion;

means fixedly provided in the housing for emitting a radiation beam;

a vibrating means provided at the opening portion of the housing in a vibratory manner for converting incident acoustic energy into a mechanical displacement;

means mechanically coupled with the vibrating means for reflecting the radiation beam;

means fixedly provided in the housing for transducing the radiation beam reflected by the reflecting means into the electric signal; and means having a code pattern and provided between the reflecting means and the transducing means for modulating the radiation beam in accordance with a variation of relative position of the code pattern and the radiation beam due to the displacement of the reflecting means;

whereby the electric signal which constitutes a digital signal designating the displacement of the vibrating means is directly obtained from the transducing means.

According to the present invention, the radiation beam is modulated by a variation of relative position of the code pattern and the radiation beam and is transduced into a digital signal, so that the construction of the microphone is made simple and a complicated signal processing circuit is not required.

Other objects and advantages of the invention will become apparent from the following description of the embodiments with reference to the accompanying drawings.

DESCRIPTION OF THE PREFERRED EMBODIMENTS

Figure 1:
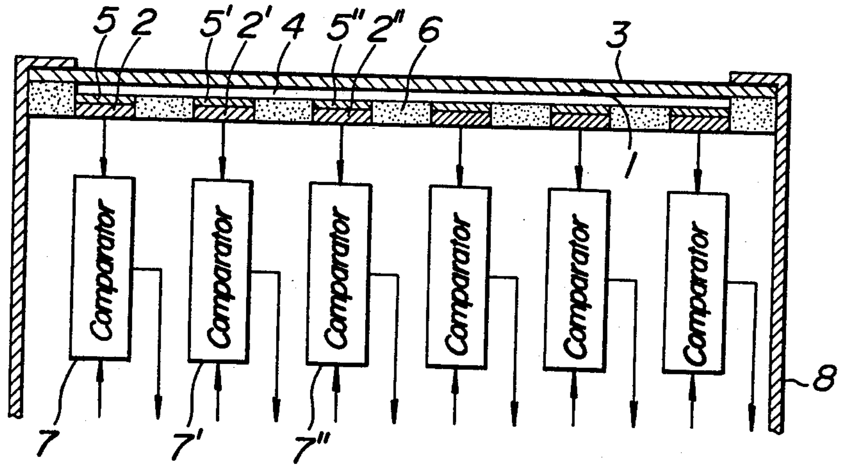
FIG. 1 PRIOR ART
FIG. 1 is a sectional view of a part of a conventional microphone.
Figure 2:
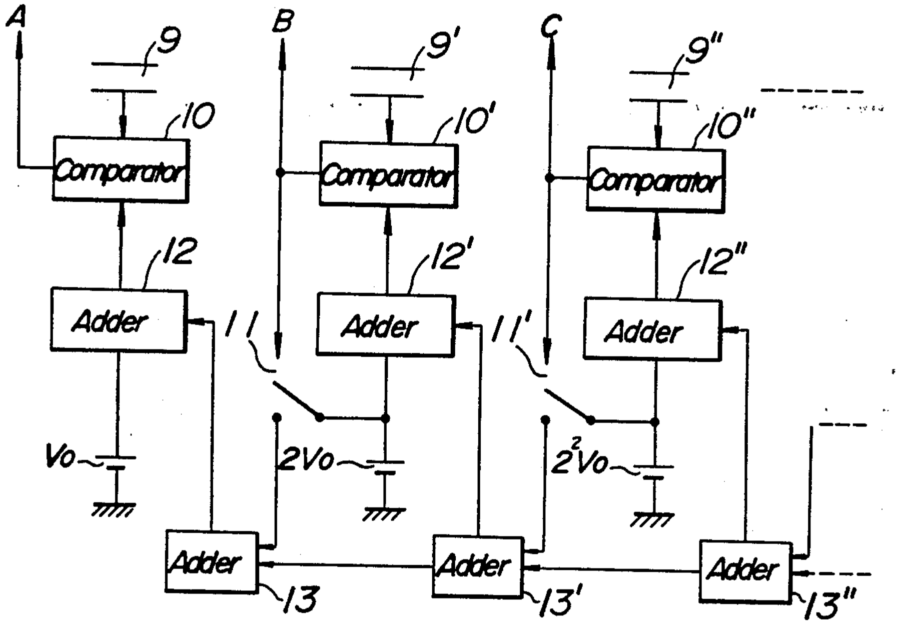
FIG. 2 PRIOR ART
FIG. 2 is a block diagram of a part of an electric circuit included in the microphone of FIG. 1.
Figure 3:
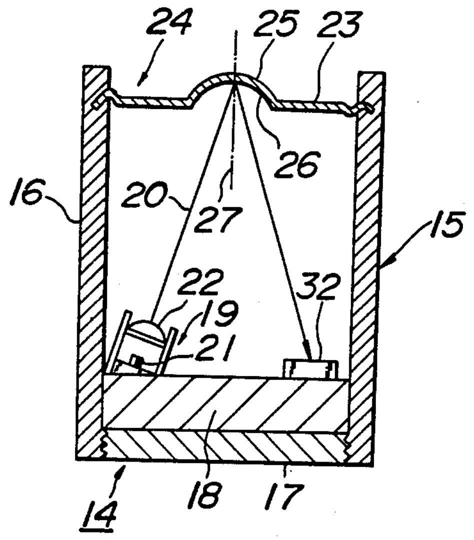
FIG. 3 is a sectional view showing an embodiment of the digital microphone according to the invention.

FIG. 3 shows a sectional view of a preferred embodiment of the digital microphone according to the invention. The digital microphone 14 comprises a housing 15 having a cylindrical side wall 16 and a circular bottom plate 17 which is screwed into the lower portion of the side wall 16 so as to move up and down. A circular base plate 18 is supported on the bottom plate 17 in such a manner that it is able to slide along the side wall 16 without rotating according to the rotating movement of the bottom plate 17. A light source 19 is fixed on the base plate 18, which emits a light beam 20 having a flat cross-section, hereinafter referred to as a band-shaped light beam. The light source 19 comprises a light emitting element 21 such as a light emitting diode, a semiconductor laser or the like and a cylindrical lens 22 which converts the light beam from the light emitting element 21 into the band-shaped light beam 20 which slightly converges in the direction perpendicular to the expanding direction thereof and has the thickness of 10–50 $\mu$m.

A circular diaphragm 23 is provided at the opening portion 24 of the housing 15 with the circumferential edge thereof fixed into the side wall 16. The diaphragm 23 comprises a concave cylindrical reflecting mirror 25 which is constructed integrally with the diaphragm 23 substantially at the center portion thereof. The configuration of a reflecting surface 26 of the concave cylindrical mirror 25 viewed in the longitudinal direction thereof may be a part of circle, ellipse, hyperbola or the like. The mirror 25 is so set that its longitudinal direction is made in parallel with the expanding direction of the light beam 20, in this case perpendicular to the plane of the drawing. A direction shown by a chain line 27 bisecting longitudinally the mirror 25 is made in parallel with the vibrating direction of the diaphragm 23.

Figure 4:
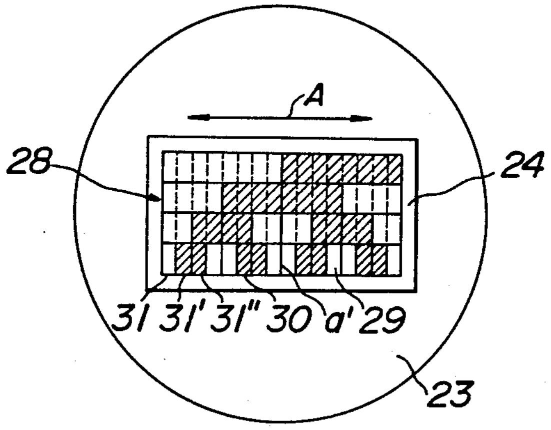
FIG. 4 is a bottom view of a diaphragm for illustrating a gray code pattern.

A binary code pattern having the desired number of bits is directly formed in a reflecting surface 26 of the mirror 25. That is to say the binary code pattern consists of the combination of reflecting areas and unreflecting areas of the mirror 25. An example of the binary code pattern is shown in FIG. 4 which is a bottom view of the diaphragm 23. It should be noted that the binary code pattern 28 is illustrated exaggeratively to make it clarify. The code pattern 28 denotes a four bit binary code pattern which is constructed as a gray code in which a hammings distance of each word is unity. The gray code pattern 28 is constituted by the combination of reflecting area 29 and unreflecting area 30 (hatched region), the former corresponding to the binary code "1" and the latter to "0". The combination is formed by a plurality of columns 31, 31', 31" . . . each consisting of four reflecting areas and/or unreflecting areas. These columns are arranged adjacently each other in the direction denoted by a double-headed arrow A which is perpendicular to the expanding direction of the light beam 20. A series of four bit gray code (four bit word) of the pattern 28 viewed from the left-hand side to the right-hand side in FIG. 4 correspond to (1111), (1110), (1100), . . . , (0110) and (0111).

Returning now to FIG. 3, a photo electro transducing device 32 fixed on the base plate 18 comprises an array of four photo electro transducers. The number of the transducers is equal to that of the areas in each column 31, 31', 31" . . . of the binary code pattern 28. Any element such as phototransistor, photodiode, element the resistivity of which is varied by a light beam, for example, CdS or the like may be used as the photo electro transducer.

Figure 5:
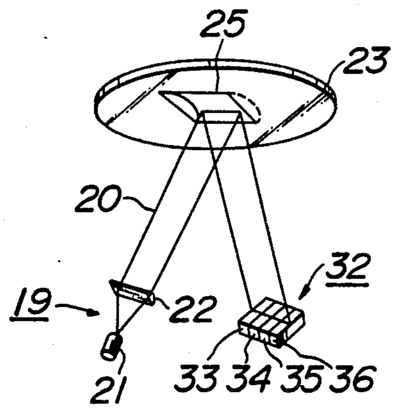
FIG. 5 is a perspective view illustrating a positional relation between optical elements of the microphone of FIG. 3.

FIG. 5 shows the light source 19, the diaphragm 23 and the transducing device 32 in order to make clear their positional relation with respect to the band-shaped light beam 20. The light beam from the light emitting element 21 is changed into the band-shaped light beam 20 and is made incident upon the mirror 25 in which surface 26 the binary code pattern 28 is formed. The band-shaped light beam 20 impinges upon the mirror 25 in such a manner that the plane of incidence to the mirror is perpendicular to the longitudinal direction of the cylindrical mirror and the band-shaped light beam is expanded perpendicularly to the plane of incidence. The light beam reflected by the mirror 25 impinges upon the photo electro transducing device 32 which comprises an array of four photo electro transducers 33, 34, 35 and 36 which are arranged adjacently each other in the expanding direction of the light beam 20. The number of the transducers is equal to four, because the pattern 28 is the four bits binary code pattern.

Figure 6:
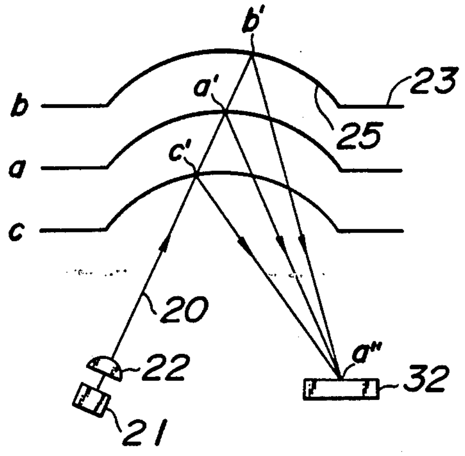
FIG. 6 is a schematic view illustrating a positional relation between a light beam and optical elements.

FIG. 6 shows the variation of the incident positions of the light beam 20 upon the reflecting surface 26 of the mirror 25 when the diaphragm 23 and thus the mirror 25 vibrate. In the FIG. 6, the expanding direction of the band-shaped light beam 20 is perpendicular to the plane of the drawing. When the diaphragm 23 is in a stationary position a, the light beam 20 impinges upon a center portion a' of the mirror 25, i.e. the center portion of the code pattern 28 (see FIG. 4) and upon a center portion a" of the transducing device 32. When the diaphragm 23 is displaced from the stationary position a to upper and lower positions such as denoted by b and c, respectively, the light beam 20 impinges upon positions b' and c' shifted from the central portion a' along the binary code pattern 28. Therefore, the binary code pattern 28 is scanned by the band-shaped light beam 20 in the direction denoted by the double-headed arrow A in FIG. 4. As a result of this, the light beam 20 is modulated in the expanding direction by the binary code pattern 28 and then is made incident upon the transducing device 32. The modulated light beam is converted into a digital signal by means of the photo electro transducers 33, 34, 35 and 36 each related to the respective bits of the binary code. Therefore, the binary code output signal which designates an amount and a direction of the displacement of the diaphragm 23 is obtained from the photo electro transducing device 32.

According to the embodiment, the light beam 20 reflected at the various positions on the code pattern 28 are collected substantially at one position a" on the transducing device 32 due to the concave cylindrical reflecting mirror 25 and therefore, the photo electric transducing device having a comparatively short length in the scanning direction of the light beam may be employed.

Figure 7:
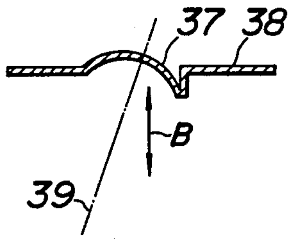
FIG. 7 is a sectional view of another embodiment of a reflecting mirror constructed integrally with a diaphragm.

FIG. 7 shows the cross-sectional view of a modification of the concave cylindrical reflecting mirror. The mirror 37 is constructed integrally with the diaphragm 38 and the direction bisecting the mirror in the longitudinal direction thereof is inclined to the vibrating direction of the diaphragm 38. The direction bisecting the mirror is shown by the chain line 39 and the vibrating direction of the diaphragm 38 is denoted by a double-headed arrow B.

According to the embodiment aforementioned with reference to FIGS. 3 to 6, the direction bisecting longitudinally the mirror 25 is parallel with the vibrating direction of the diaphragm so that the incident position of the light beam upon the binary code pattern 28 is not linearly proportional to the displacement of the diaphragm 23. Therefore, the binary code pattern must be formed asymmetrically with respect to the central portion a' thereof in order to obtain a linear relation between the incident position of the light beam and the displacement of the diaphragm. However, in the mirror 37 shown in FIG. 7, if the band-shaped light beam is made incident upon the reflecting mirror 37 is the direction denoted by 39 at the stationary position of the diaphragm 38, the incident position is substantially linearly related to the displacement of the diaphragm 38. Consequently, the binary code pattern may be formed substantially in symmetrical manner, which is advantageous for the fabrication of the pattern.

Figure 8:
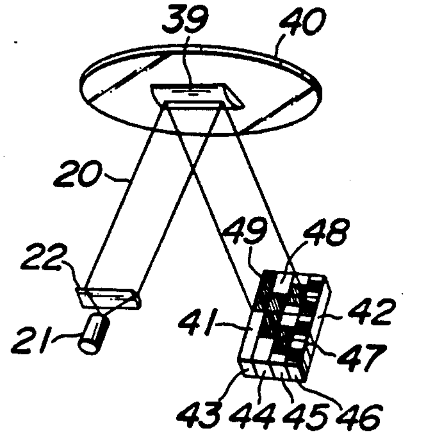
FIG. 8 is a perspective view of another embodiment in the invention.

FIG. 8 shows another preferred embodiment of the invention, in which the reflecting mirror is a convex cylindrical reflecting mirror 39 constructed integrally with a diaphragm 40 and a gray code pattern 41 is formed on a light receiving surface of a photo electro transducing device 42. The configuration of the reflecting surface of the convex cylindrical mirror 39 viewed in the longitudinal direction thereof may be a part of circle, ellipse, hyperbola or the like.

In this embodiment, also, a light beam from a light emitting element 21 is converted into a band-shaped light beam 20 by means of a cylindrical lens 22 and is made incident upon the mirror 39. The light beam reflected by the mirror impinges upon the binary code pattern 41. The expanding direction of the band-shaped light beam is, also, the same as that of the embodiment described with reference to FIGS. 3 to 6. The transducing device 42 comprises a plurality of photo electro transducers 43, 44, 45 and 46 which are adjacently arranged each other in the direction parallel with the expanding direction of the light beam 20. The number of the transducers is also equal to the number of desired bits of the binary code, in this case four bits of the gray code.

In contrast to the embodiment as previously described, an aluminum flim 47 having the binary code pattern 41 is applied on the light receiving surface of the transducers 43, 44, 45 and 46. The binary code pattern consists of the combination of light passing area 48 and light interrupting area 49 (hatched region). The combination is constituted by a plurality of columns each consisting of four light passing areas and/or the light interrupting areas, each column is arranged adjacently each other in the direction perpendicular to the expanding direction of the light beam.

Figure 9:
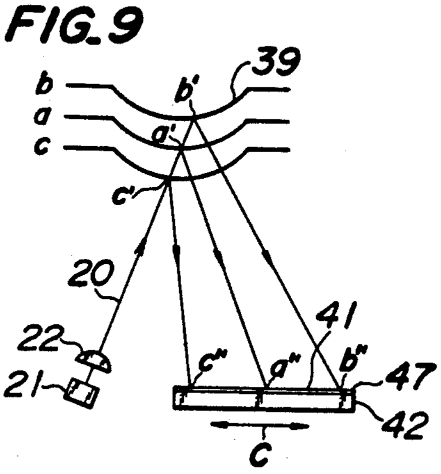
FIG. 9 is a schematic view illustrating a positional relation between a light beam and optical elements of the microphone of FIG. 6.

FIG. 9 shows the variation of the incident positions upon the mirror 39 and the film 47 provided on the transducing device 42 when the diaphragm 40 and the mirror 39 vibrate. When the diaphragm 40 is in a stationary position a, the light beam impinges upon a center portion a' of the mirror 39 and a center portion a" of the pattern code 41 formed on the aluminum film 47.

When the diaphragm 40 is displaced from the stationary position a to upper and lower positions such as denoted by b and c, respectively, the light beam impinges upon position b' and c' of the mirror 39. The beam reflected at the positions b' and c' are made incident upon positions b" and c" of the film 47, respectively. Therefore, the binary code pattern 41 is scanned by the band-shaped light beam 20 in the direction denoted by a double-headed arrow C. As a result of this, the light beam 20 is modulated by the binary code pattern 41 and then is made incident upon the transducing device 42.

The photo electro transducers which receive the light beam through the light passing areas 48 of the aluminum film 47 supply a binary code signal "1" and other transducers upon which the light beam is not made incident supply a binary code signal "0". In this manner, the digital output signal which designates the displacement of the diaphragm 40 can be directly obtained from the photo electro transducers 43, 44, 45 and 46.

According to this embodiment, the light beam reflected by the mirror 39 is widely moved in the scanning direction C because the mirror is a convex reflecting cylindrical mirror, and as a result of which, the scanning distance on the aluminum film 47 becomes larger so that the number of column consisting of the binary code pattern 41 may be increased, which make it possible to obtain the digital microphone having a high sensitivity. In this embodiment, it is apparent that the aluminum film 47 may be provided on the reflecting surface of the mirror 39 instead of the surface of the transducing device 42. Alternatively, the mirror may be a concave cylindrical reflecting mirror.

Figure 10:
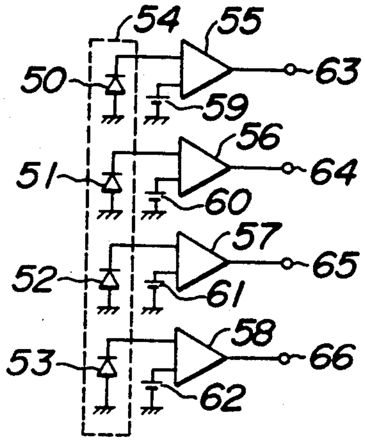
FIG. 10 is a diagram of a signal processing circuit.

In the digital microphones of the present invention so far described, when the band-shaped light beam impinges upon a boundary region between two adjacent columns of the gray code pattern, the magnitude of the output signals from one of the photo electro transducers is decreased to half the nominal magnitude. This might result in an erroneous output signal. In order to compensate such a drawback, it is desirable to make use of a signal processing circuit shown in FIG. 10. In the figure, reference numerals 50, 51, 52 and 53 denotes the photo electro transducers which constitute the transducing device 54 and reference numerals 55, 56, 57 and 58 show comparators having one inputs connected to the photo electro transducers and the other inputs connected to reference voltage sources 59, 60, 61 and 62 producing threshold values. Each threshold value is so set that it is just half the nominal magnitude of the output signal from the transducers 50, 51, 52 or 53. Therefore, when the light beam impinges upon the boundary region between adjacent columns of the binary pattern code, for example, between the gray codes (0000) and (0001), and the magnitude of the output signal of the transducer which corresponds to the least significant but is decreased to about a half the normal magnitude, the comparator 62 related to the least significant bit compared the output voltage of the transducer 53 with the reference voltage from the voltage source 62 and supplies the output signal "1" in case that the output voltage is equal to or higher than the reference voltage, but supplies the output signal "0" in case that the output voltage is lower than the reference voltage.

Although the invention has been described in its preferred embodiments, it is to be understood by those skilled in the art that various changes and modifications may be made in the invention without departing from the spirit and scope thereof. For instance, a plane reflecting mirror may be used instead of the cylindrical reflecting mirror. Also, the diaphragm and the reflecting mirror are constructed separately and mechanically coupled with each other. Additionally, the digital signal having other than four bits, for example, 14 bits (one word) used in a digital audio disc and the like may be obtained.

What is claimed is:

1. A digital microphone for converting an incident acoustic energy into an electric signal comprising:

a housing having an opening portion;

means fixedly provided in the housing for emitting a radiation beam;

a vibrating means provided at the opening portion of the housing in a vibratory manner for converting the acoustic energy into a mechanical displacement;

means mechanically coupled with the vibrating means for reflecting the radiation beam;

means fixedly provided in the housing for transducing the radiation beam reflected by the reflecting means into the electric signal; and means having a code pattern and provided between the reflecting means and the transducing means for modulating the radiation beam in accordance with a variation of relative position of the code pattern and the radiation beam due to a displacement of the reflecting means wherein the reflecting means is constructed integrally with the vibrating means, and the modulating means is mounted on the reflecting means; whereby the electric signal which constitutes a digital signal designating the displacement of the vibrating means is directly obtained from the transducing means.

2. A digital microphone according to claim 1, wherein the radiation emitting means comprises a light source for emitting a band-shaped light beam expanding in a given direction, the reflecting means is a convex cylindrical reflecting mirror, the longitudinal direction thereof being in parallel with the expanding direction of the light beam, and the transducing means comprises a photo electro transducing device.

3. A digital microphone according to claim 1, wherein the radiation emitting means comprises a light source for emitting a band-shaped light beaim expanding in a given direction, the reflecting means is a concave cylindrical reflecting mirror, the longitudinal direction thereof being in parallel with the expanding direction of the light beam, and the transducing means comprises a photo electro transducing device.

4. A digital microphone according to claim 2 or 3, wherein configuration of a reflecting surface of the mirror viewed in the longitudinal direction is a part of circle.

5. A digital microphone according to claim 2 or 3, wherein a direction bisecting the mirror in the longitudinal direction thereof is inclined to a vibrating direction of the vibrating means.

6. A digital microphone according to claim 2 or 3, wherein the band-shaped light beam is slightly converged in the direction perpendicular to the expanding direction thereof.

7. A digital microphone according to claim 6, wherein the light source comprises a cylindrical lens, the longitudinal direction thereof being in parallel with the expanding direction of the light beam.

8. A digital microphone according to claim 2 or 3, wherein the modulating means comprises a film having a binary code pattern consisting of a combination of a plurality of light passing areas and a plurality of light interrupting areas.

9. A digital microphone according to claim 8, wherein the combination is constituted by a plurality of columns each consisting of at least two of the light passing area and/or the light interrupting area, each column having the same number of areas and being arranged adjacent each other in the direction perpendicular to the expanding direction of the light beam, and the photo electro transducing device comprises an array of a plurality of photo electro transducers, the number thereof being equal to that of the areas included in each column and the transducers being arranged adjacently each other in the expanding direction of the light beam.

10. A digital microphone according to claim 9, wherein the pattern is a gray code pattern.

11. A digital microphone according to claim 9, wherein the light source and the array of the photo electro transducers are fixed on a base plate which is arranged in the housing movably in the vibrating direction of the mirror.

12. A digital microphone according to claim 9, further comprising an electric circuit for, when the light is made incident upon a boundary region between two adjacent columns, discriminating respective output signals from the photo electro transducers to decide each digital value of the output signals.

13. A digital microphone according to claim 2 or 3, wherein the pattern is directly formed in the reflecting surface of the mirror.

14. A digital microphone according to claim 13, wherein the pattern is constructed by a binary code pattern consisting of a combination of a plurality of reflecting areas and unreflecting areas of the mirror.

15. A digital microphone according to claim 14, wherein the combination is constituted by a plurality of columns each consisting of at least two of the reflecting area and/or the unreflecting area, each column having the same number of areas and being arranged adjacently each other in the direction perpendicular to the expanding direction of the light beam, and the photo electro transducing device comprises an array of a plurality of photo electro transducers, the number thereof being equal to that of the areas included in each column and the transducers being arranged adjacently each other in the expanding direction of the light beam.

16. A digital microphone according to claim 15, wherein the pattern is a gray code pattern.

17. A digital microphone according to claim 15, wherein the light source and the array of the photo electro transducers are fixed on a base plate which is arranged in the housing movably in the vibrating direction of the mirror.

18. A digital microphone according to claim 15, further comprising an electric circuit for, when the light beam is made incident upon a boundary region between two adjacent columns, discriminating respective output signals from the photo electro transducers to decide each digital value of the output signals.

* * * * *